United States Patent
Johansen et al.

(10) Patent No.: US 7,184,581 B2
(45) Date of Patent: Feb. 27, 2007

(54) SYSTEM FOR REAL TIME FINGER SURFACE PATTERN MEASUREMENT

(75) Inventors: Ib-Rune Johansen, Oslo (NO); Jon Nysaether, Oslo (NO); Jon Tschudi, Oslo (NO); Ovidiu Vermesan, Stabekk (NO)

(73) Assignee: Idex ASA, Fornebu (NO)

( * ) Notice: Subject to any disclaimer, the term of this patent is extended or adjusted under 35 U.S.C. 154(b) by 680 days.

(21) Appl. No.: 10/297,744

(22) PCT Filed: Jun. 8, 2001

(86) PCT No.: PCT/NO01/00240

§ 371 (c)(1), (2), (4) Date: Apr. 28, 2003

(87) PCT Pub. No.: WO01/94902

PCT Pub. Date: Dec. 13, 2001

(65) Prior Publication Data

US 2003/0165261 A1    Sep. 4, 2003

(30) Foreign Application Priority Data

Jun. 9, 2000    (NO) .................................. 20003005

(51) Int. Cl.
*G06K 9/00* (2006.01)
(52) U.S. Cl. .................................................... 382/124
(58) Field of Classification Search ........ 382/115–116, 382/124–126; 235/380, 382, 382.5; 340/5.53, 340/5.83

See application file for complete search history.

(56) References Cited

U.S. PATENT DOCUMENTS

| | | | |
|---|---|---|---|
| 6,052,475 A | 4/2000 | Upton | |
| 2001/0005424 A1 | 6/2001 | Marksteiner | |

FOREIGN PATENT DOCUMENTS

| | | |
|---|---|---|
| NO | 304766 B1 | 12/1998 |
| SE | 448408 A | 2/1987 |
| WO | WO 9852147 A1 | 11/1998 |
| WO | WO 9858342 A1 | 12/1998 |

*Primary Examiner*—Vikkram Bali
(74) *Attorney, Agent, or Firm*—Rothwell, Figg, Ernst & Manbeck, P.C.

(57) ABSTRACT

This invention relates to a system for measuring patterns in finger surfaces, the system comprising an array of sensor electrodes over which the surface is to be moved, and at least one stimulation electrode for providing a varying current or voltage between the stimulation electrode and the number of sensors through the surface. The stimulation electrode is positioned separately from the array of sensor electrodes and the system comprises a generator coupled to the stimulation electrode for applying a current or voltage with a varying amplitude or phase to the surface. The system comprises a measuring unit coupled to the sensor electrodes for, during the application of the current or voltage, measuring the impedance at the sensor electrodes in a time sequence and calculating values of predetermined characteristics of the surface and combining the calculated values for the sensor electrodes over the time sequence for generating a representation of the surface pattern.

18 Claims, 4 Drawing Sheets

SYSTEM FOR REAL TIME FINGER SURFACE PATTERN MEASUREMENT

This invention relates to a system for measuring patterns in a surface, especially in finger surfaces, the system comprising a number of sensor electrodes being provided with an electrically insulating material over which the surface is to be moved, and at least one stimulation electrode for providing a varying current or voltage between the stimulation electrode and the number of sensors through the surface.

Biometrics technologies include face recognition using optical or thermal imaging; finger imaging using optical, thermal, AC- and DC-capacitive sensing; hand-geometry measurement and palm scanning; iris and retina scanning; signature recognition; and voiceprints.

Finger surface pattern detection and matching is a technique use for identification and verification of persons and of all the biometrics technologies, is the one that currently has received most attention due to its technical capabilities and low cost solutions.

U.S. Pat. No. 5,963,679 to Setlak, disclose a fingerprint sensor that includes an array of electric field sensing electrodes that measures the capacitance of the fingerprint by using an AC electric field. The AC electric field method involves using an array of excitation antennas at the base that propagate electric fields through a sensing array to detect fingerprint contours. These fields penetrate the skin surface, originating from the conductive live layer of skin cells beneath the skin surface. This is in contrast to the spherical or tubular field geometries generated by simple capacitive sensors, which only fringe the very top surface of the skin. The method requires that the electrical field is radiated from the sensor to the finger which needs extra shielding for the electronics. In addition, the system uses only a single frequency and do not change and adapt the electrical characteristics (frequency, amplitude, phase) of the electrical field with the characteristics of the finger (dry, wet, etc.) At the same time the area required for realising the sensor is very big which increase the cost and limit the area in which the sensor can be used.

Thomson-CSF (now Atmel) uses a linear or an array of semiconductor temperature sensors to capture fingerprint images. The finger's ridges are close to the chip and thus conduct heat away more effectively than do the valleys, which are insulated by a layer of air. The Fingerchip as it is called has a linear shape, allowing the capture of a fingerprint image by sweeping the finger across the sensing area. After capturing several images, the software can reconstruct a full fingerprint image. The implementation is area efficient but the temperature variation of the environment can make the measurement imprecise.

The present invention relates to a system for real time finger surface pattern measurement wherein the system is provided with a plurality of electrodes to be placed on the upper metal layer of multi metal layer silicon or packaging system, a pair of input electrodes for stimulating the finger with an electrical variable frequency signal to the part of the finger and a measuring plurality of electrodes for measuring the voltage at the electrodes of the measuring electrodes, comprising a current or a voltage generator providing the measuring electrical variable frequency signal, a converter for the transformation of the measuring signal into an electric signal, being a measure of the impedance of the part of the finger surface, and means for the generation of signals which form a measure for further variables with the aid of which said parameter can be determined using a calculating model, said signals encompassing a signal forming a measure for the impedance signal.

It is the object of the invention to apply the measuring results becoming available when employing this system in such a way that the finger surface pattern can be determined more accurately.

To this end the system of the invention is characterised in that the current or voltage generator is separated from the sensing electrodes and measuring electronics, and is suitable for generating a measuring electrical variable frequency signal having an amplitude that can be varied for the different frequencies generated, in a frequency range of up to about 1000 kHz. This provides independent measurements for fingers that have different characteristics (dry, wet etc.). The parameters that can be determined by means of the system according to the invention include preferably the measuring of the finger surface pattern, the characteristics of the finger (dry, wet), the moment when the finger is approaching and comes in contact with the sensor and the fact that the finger is alive (life finger detection, dead finger detection).

The front end sensors for measuring the finger surface pattern is formed by a plurality of electrodes, e.g. formed by a metal or polysilicon layer. The sensors are placed on a row orthogonal on the movement direction of the finger (horizontal or vertical) and with a number of sensor elements placed in the movement direction of the finger for speed measurements. The finger is not in direct contact with the metal or polysilicon electrodes but via an electrically isolating material which cover the electrodes. The material has electrical functions in the measurement principle, is impermeable, has mechanical strengths and protects the sensor against mechanical stress, electrical discharge, chemical agents and other external factors. An electrical signal stimulates the finger and the system determines and measures in real time the finger surface pattern.

It has been determined that the application of different frequencies for the determination of finger surface pattern can be used for fingers with different electrical properties. Signals of different frequencies are used for the measurement and determination of finger surface pattern. The maximum frequency may, however, be limited to 500 kHz due to radiation problems.

In addition it is desirable that means are provided for the determination of maximum phase shift between the measuring current and the measuring voltage as a function of the frequency. This allows the electric transfer function of the particular part of the finger surface to be determined, with the angular frequency being the independent variable. This permits at the same time the determination of the ratio between intra and extra cellular fluids and if the finger is alive or not. This ratio is directly related to the frequency at which the phase angle is at a maximum. With persons that have a normal finger this maximum phase angle is at about 100 at 100 kHz. In addition a temperature sensor may be placed on the system which will determine the temperature of the finger and correlate with information related to the electrical characteristics of the finger will determine if the finger is alive, dead or fake.

The system is preferably provided with connecting means for connecting the current or voltage generator of the stimulation signal to the finger and realising a good electrical contact with an electrode that is characterised by good electrical characteristics and is resistant to corrosion and wearout. This is one factor that will assure that reproducible measurements are obtained. The stimulation electrode for injecting the variable frequency into the finger is placed at close distance around the sensors, and has special geometry (finger, etc.) and different functions.

Another embodiment of the system according to the invention is characterised in that said system comprises a current or voltage generator suitable for the generation of signals at different frequencies, amplitudes and phases. These frequencies can range from about 10 to 500 kHz.

Another embodiment of the system according to the invention is characterised in that said the system comprises of a structure with intrinsic ESD (elctro static discharge) protection.

The ESD protection can be kept to the limits of 2 kv if a number of issues are considered:

The ESD protection realised by using a finger discharge method (finger ground connection via one terminal of the activation cell) that is used in connection with the power control mechanism and the activation cell in such a way that the active electronic blocks of the fingerprint sensor remain grounded until the charge on the finger is removed and then activated.

The method used to measure the capacitance of the finger considers that the voltage at the sensor pad is reduced via the voltage divider realised with the capacitors $C_{EI}$ and $C_{IN}$ by a factor in the order of 1000. Typical values for the capacitance for the capacitors are for $C_{EI}$ in the range of tens of fF, and for $C_{IN}$ a fez pF. The maximum voltage limits for the dielectric $C_{EI}$ is determined by the area, thickness and permeability of the electrically isolating material. The structure has intrinsic increased ESD at two levels. From finger to ground via the isolating layer and from the sensor pads from the input of electronics.

The output of the variable frequency generator should be coupled via an ESD protection circuit that assume 20 KV ESD before it is applied to the stimulation electrode and finger.

Another embodiment of the system according to the invention is characterised in that said system comprises an activation cell suitable for detection when the finger is approaching and contacts the sensor. Contact cell or activation cell detects when the finger gets in contact with the surface of the cell and a change in electrical characteristics, preferably impedance is determined between the electrodes and this change is converted into an electrical signal which starts and power up the whole system. The activation cell may be a dedicated sensor in the sensor array, or a separate sensor. A separate sensor may be of any available type, e.g. sensing changes in the capacitance close to the sensor, temperature or optical detectors.

Another embodiment of the system according to the invention is characterised in that said the system comprises a structure that is suitable for navigation/mouse uses, e.g. in relation to a display, by moving the finger along the sensors plane.

Another embodiment of the system according to the invention is characterised in that said system comprises of electrode with multiple functions (activation cell, electrical characteristic measurement for the finger, stimulation electrode). The electrode has different functions depending on the operating mode of the system:

In measurement or detection mode has a function of stimulation electrode connected to the output of a variable frequency generator, which introduces into the finger the electrical stimulation variable signal. The connection to the finger can be AC or DC.

In wait mode has a function of contact sensor, which detects when a finger is approaching the system and when is contacting the sensor. In this mode the structure of the electrode is split into two electrodes with a distance between. Can be used for ESD protection if one of the electrodes of the structure is coupled to ground.

The sensor may also be adapted to detect whether the finger is dead or alive by measuring the electrical characteristics, preferably impedance, of the finger and to detects and measure the electrical characteristics, preferably impedance, of the finger and determine if the finger is dry or wet in order to generate the appropriate frequency with the right amplitude and phase to have a maximum signal.

The invention provides a number og advantages over the known technology, obtianing a very small area that may not likely be obtained by any methods available today. The system is five times smaller than the apparatus described in U.S. Pat. No. 5,963,679. In addition it and the related circuitry is compact and may be built with commercial technology, e.g. in a silicon process with multiple metal layers.

The invention will now be further described with reference to the figures illustrating the invention by way of example.

Figure 1:
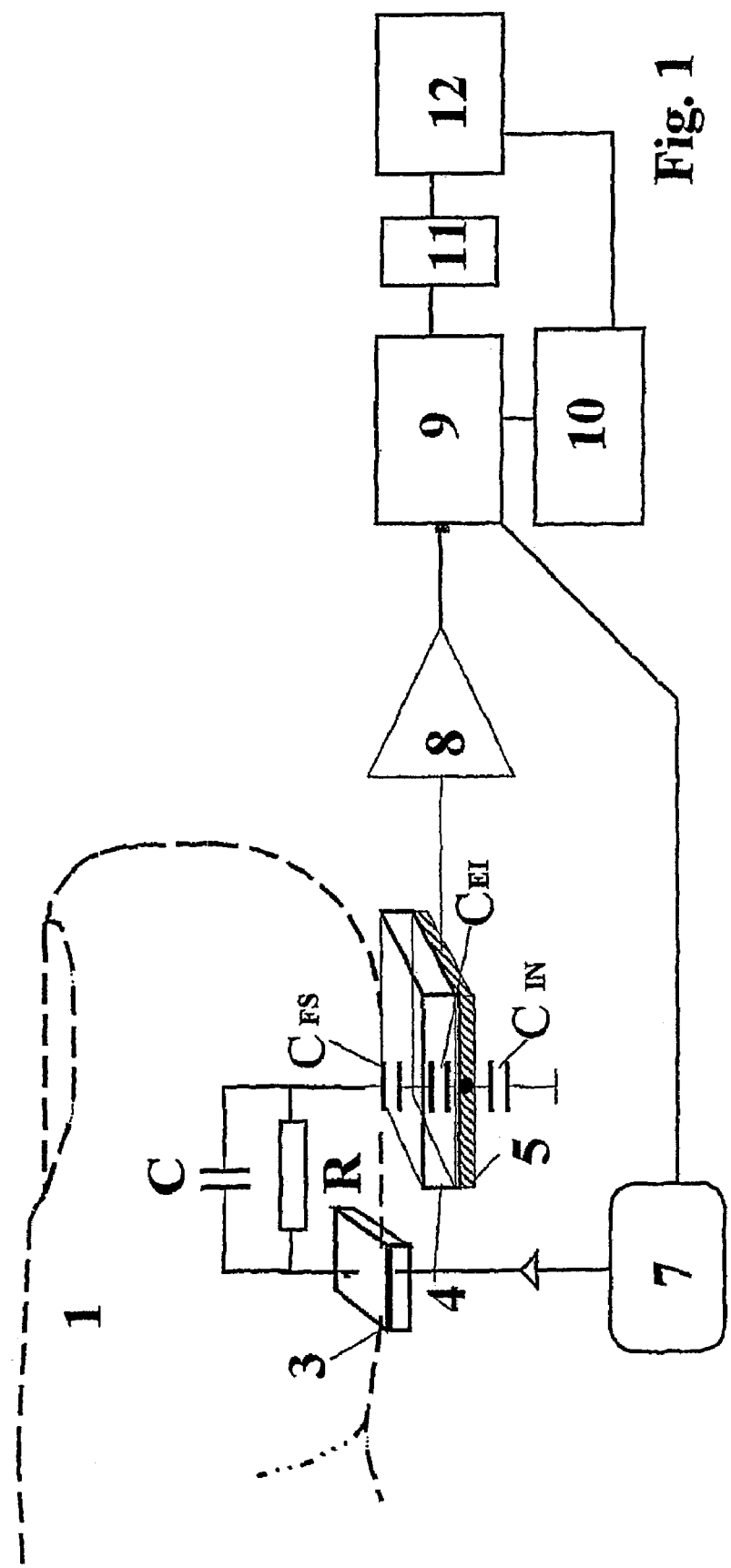
FIG. 1 represents schematically a first measuring arrangement of the system according to the invention.

FIG. 1 shows a block diagram of an embodiment of the system for carrying out simultaneous measurements on a finger. By means of a stimulation electrode 3 a current or voltage from a generator 7 is supplied to the finger 1. The voltage or current generator is adapted to provide a variable amplitude, frequency and/or phase signal to the electrode 3. The signal resulting from current passing through the tissue of the finger, the finger surface, and the electrically insulating material 4 that separates the finger surface from the sensor electrode 5 is measured by means of the electrode 5, which is connected with a front end analog reading circuit 8 including a low noise amplifier.

The output of the front end analog reading circuit 8 is supplied to a calculating element 9 which provides an electric impedance signal which is directly related to the impedance of a locally measured part of the finger 1 as a function of the time and a phase signal which is directly related to the phase difference between the current or voltage supplied into said part of the finger 1 and the resulting voltage over that part of the finger as measured by means of the electrode 5.

The electric signal is fed into the digital signal processing unit 12 through an interface 11 comprising an analog to digital converter in order to determine a parameter to determine the electrical characteristics of the finger (dry, wet) and if the finger is dead or alive. The processor 12 preferably controls the frequency, phase and amplitude of the current or voltage generator and adaptively adjust these parameters based on the finger's electrical characteristics.

Also, the digital processing unit 12 receives information from all the sensors related to the fingerprint scanner, calculating a representation of the finger surface being usable for identification purposes.

Figure 4:
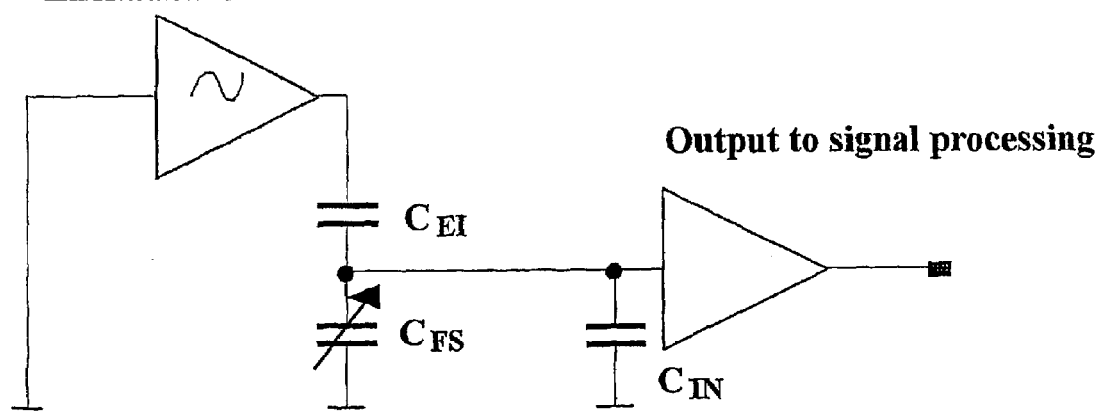
FIG. 4 shows one difference between the invention and the known art.

FIG. 4 shows one difference between the invention and the known art described in U.S. Pat. No. 5,963,679. The main difference between the two concepts lies in how the intrinsic, parasitic capacitance $C_{IN}$ to the amplifier is coupled.

In the U.S. Pat. No. 5,963,679, the capacitance $C_{IN}$ is coupled in parallell with the capacitance of the ridges or valleys to be measured while an excitation electrode generates an electric field via a fixed capacitor. This concept puts a very heavy demand on the input impedance characteristics of the amplifier, which must not be too large in comparison with the value of the capacitance of the ridges or valleys, which is usually much lower than 100 fF.

This problem is avoided by using the concept according to this invention, represented in FIG. 1. Here the stimulation signal is applied directly to the finger and the capacitance $C_{FS}$ of the ridges or valleys is connected in series with the capacitance of the electrically isolating material $C_{EI}$. The value of $C_{IN}$ may be in the order of few pF, without degrading the measurement principle. Thus concept described in this application is much less sensitive to the amplifier performance and can measure signals with aptitudes of 1 mV or less. The known art described in U.S. Pat. No. 5,963,679 requires a desirably 5 to 10 mV from the sensing elements.

Figure 5:
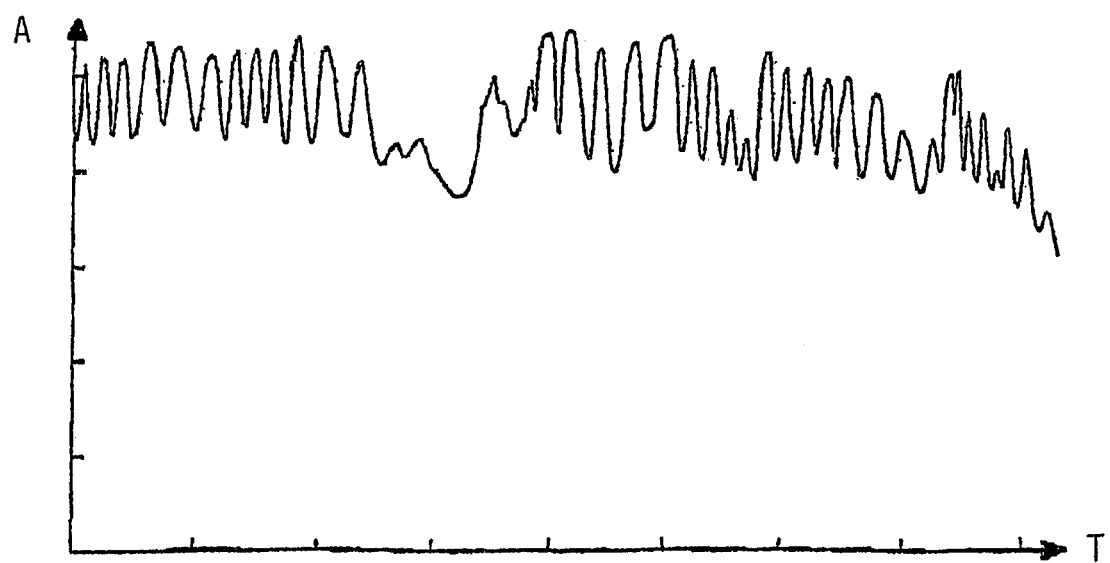
FIG. 5 shows a typical progress of an impedance signal.

FIG. 5 shows a typical progress of an impedance signal with amplitude A, as measured with the low noise phase sensitive amplifier based on a stimulation by current or voltage source. The progress of this signal is time T dependent because of the movement activity of the finger. The data is stored and process in real time by a local or remote processor.

In accordance with the invention, referring again to FIG. 1, measuring errors due to offset, dc levels, gain, wearout of the electrically isolating material on the top of the sensors and of the stimulation electrode of the system or due to measurements carried out under conditions where the normal moisture balance of the finger surface is upset (dry, wet fingers), are prevented due to the fact that the current or voltage stimulation generator 7 can generate an electric signal having variable amplitudes and frequencies. In accordance with the invention a set of calibration data is provided for these parameters. The calibration data is stored into a calibration memory block 10 in the illustrated embodiment being coupled to the analog processor 9 as well as the digital prosessing unit 12.

By processing the data from current or voltage generator 7 in an analog element 9 the measuring results becoming available from the front end analog reading circuit 8 are converted into a signal being proportional to the impedance. The current voltage generator 7 is adapted to generate currents or voltages having different frequencies with different amplitudes and phases. The analog processor 9 is connected to the generator 7 and comprises means for detecting the phase differences between the generated and the measured signals.

In a particular embodiment the current voltage generator 7 is suitable for the generation of an electric stimulation signal having a frequency sweep of about 10 kHz to 500 kfz, while the calculation element 9 is also suitable for the determination of the maximum phase angle dependent on the frequency. The generator 7 may also be connected to the processing unit 12 for controlling the generated signal relative to the measured values.

Similarly, a local impedance measurement can be carried out by means of the electrode pairs. The measurement results becoming available through the measuring front end analog reading circuit 8, together with data from the current voltage generator are fed into a processor 9, and from these a local impedance value and the phase angle between the current from the generator and the voltage from the amplifier are determined.

The processor 9 generates signals for the control of the front end analog circuit 8. The processor unit 12 preferably generates the amplitude, phase and frequency control signals.

Figure 2A:
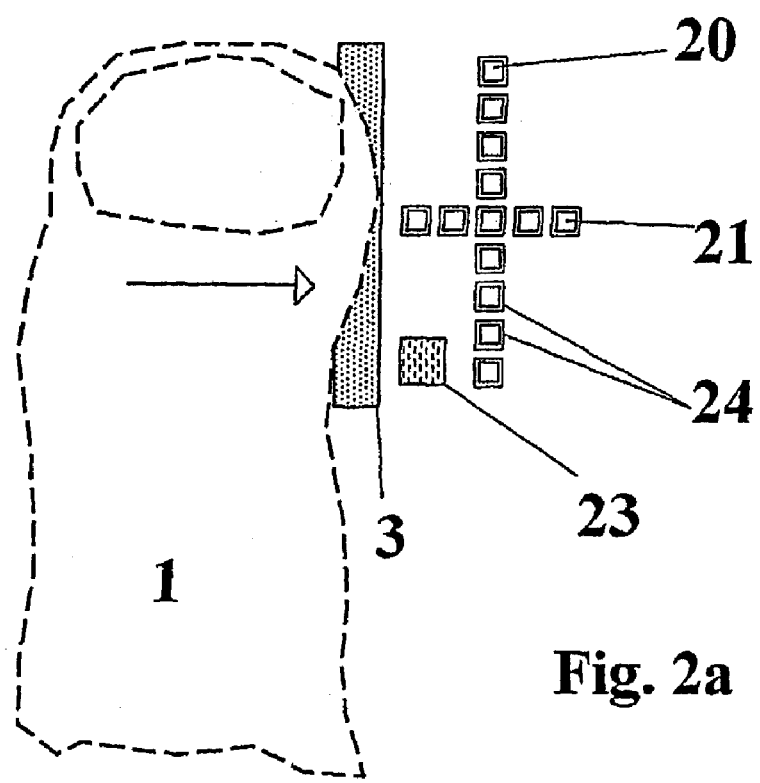
FIG. 2 represents schematically a second measuring arrangement of the system according to the invention and which explains the inherited navigation/mouse (x, y) characteristics of the system.
Figure 2B:
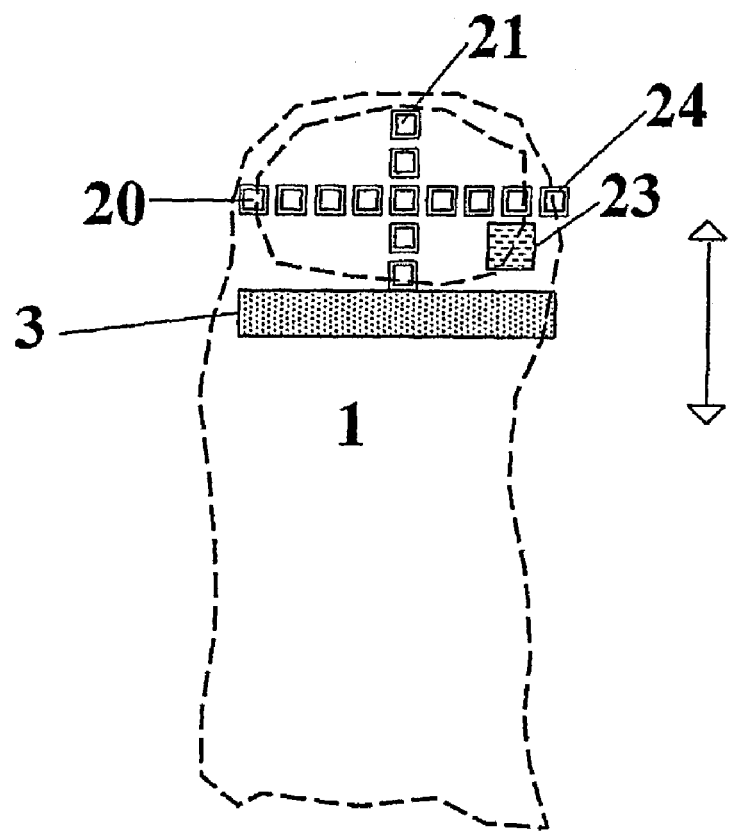

FIGS. 2a and 2b illustrates fingerprint scanner according to the invention. The fingerprint scanner here comprising a number of elektrodes constituting a linear array of electrodes 20 being placed orthogonal to the direction of the movement of the finger to scan the fingerprint by each measuring the capacitance of parts of the fingerprint, and as well a number of sensors parallel with the direction of movement 21 and serving for speed measurements.

The electric system is prone to the development of electromagnetic stray fields. The provision of the stimulation electrode 3 that is in direct contact with the finger, reduces these stray fields since the finger is absorbing the energy of the signal, and at the same time there is a grounded layer on the sensor. Each sensor electrodes 20 being surrounded by a grounded shield 24.

The role of the grounded ring 24 is:
An electrical lens that concentrates the electrical signal from the finger to the sensor electrode.
Provide a protective electrical layer for the sensor against the signal radiation generated by the frequency stimulation electrode.
Provides a protection and separation between adjacent sensor electrodes.
The grounded ring-can be made with two metals layers. Metal layer that separate the sensors and a metal layer on the top.

Figure 3:
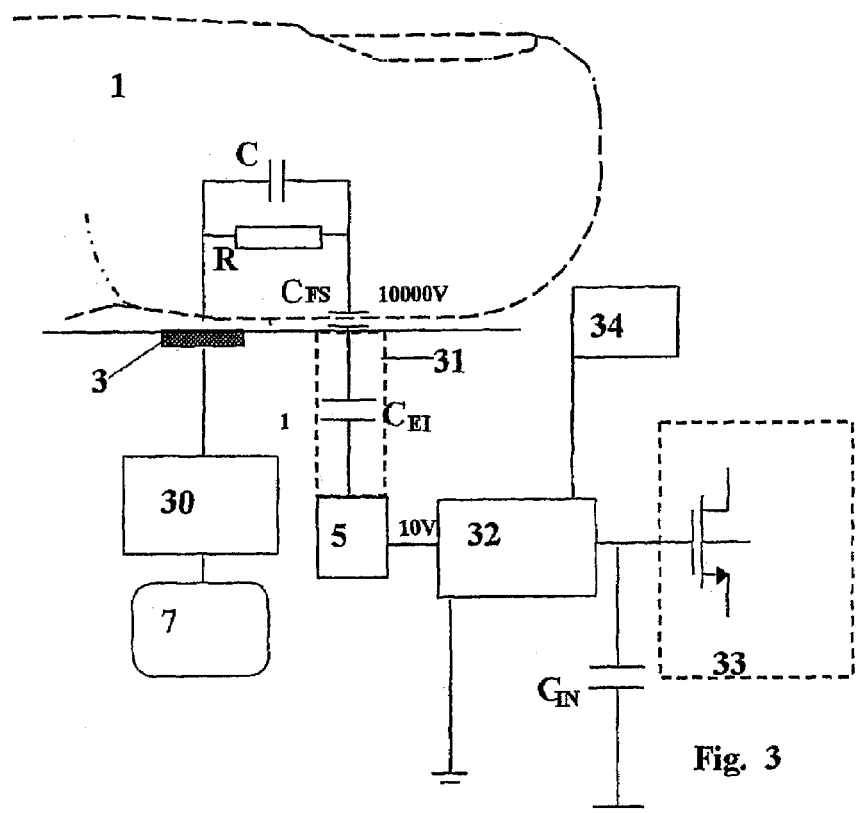
FIG. 3 represents schematically the electro static discharge (ESD) protection via the electrically isolated capacitor CEI.

FIG. 3 illustrates an embodiment of the invention being provided with electrostatic discharge (ESD) protection means 31, 32 for protection via the insulated capacitor $C_{EI}$, being positioned between the surface and the sensor pad 5. In addition ESD protection means 30, 32 are positioned between the generator 7 and the stimultation electrode, as well as between the sensor pad 5, the circuitry, ground and a power supply 34.

To summarize the invention relates to a system for real time finger surface pattern measurement, wherein the system is provided with a plurality of electrodes 5 and a electrically isolating layer 4 on the top of the electrodes 5 on which the finger 1 is applied and moved, an input electrode 3 for stimulating the finger with a variable current or voltage to the part of the finger and a measuring plurality of electrodes, 5,20 for measuring the signal at the sensor electrodes, comprising a current or voltage generator 7 providing the stimulating signal, a converter for the transformation of the measuring signal into an signal being a measure of the impedance of the part of the finger.

The current or voltage generator 7 has a minimal radiation configuration and is suitable for generating a measuring current or voltage having a variable amplitude and phase on different frequencies.

The measured parameter is a characteristic of the finger surface pattern configuration, e.g. the impedance of different points from the finger surface.

The current or voltage generator 7 is adaptive responding to control signals from the system adapting the generated current or voltage to measured characteristics of the surface, having variable amplitude, frequency and phase.

The system is preferably provided with a plurality of electrodes 20 for measuring the impedance of the parts of the finger, and transversal electrodes 21 for measuring the speed of the finger movement over the sensor's electrodes and thus having inherited navigation/mouse characteristics.

The system is provided with detection means 23, e.g. related to the stimulation electrode of the current or voltage generator, in order to determine when the finger is approaching and contact the sensor activation cell. These means may also carry out the local impedance measurement of the finger and to determine its biological characteristics (dry, wet etc.) in order to change the frequency, amplitude and phase of the stimulation signal, or local impedance measurement and temperature of the finger and to determine if the finger is dead, alive or fake.

The system may also be provided with means for the determination of maximum phase shift between the measuring current or voltage and the measuring voltage as a function of the frequency.

Usually the system according to the invention will be provided with one stimulation electrode. In some cases, however, a number of stimulation electrodes may be used.

The invention claimed is:

1. A system for measuring patterns in a surface, especially in finger surfaces, the system comprising a number of sensor electrodes being provided with an electrically insulating material over which the surface being measured is to be moved, and at least one stimulation electrode for providing a varying current or voltage between the stimulation electrode and the number of sensors through the surface, characterized in that the sensor electrodes constitutes an essentially linear array,
that the stimulation electrode is positioned separately from the array of sensor electrodes,
that the system comprises a generator coupled to the stimulation electrode for applying a current or voltage with a varying amplitude or phase to the surface, and
that the system comprises a measuring unit coupled to the sensor electrodes for, during the application of the current or voltage, measuring the impedance at the sensor electrodes relative to the stimulation electrode in a time sequence and calculating values of predetermined characteristics of the surface and combining the calculated values for the sensor electrodes over the time sequence for generating a representation of the surface pattern.

2. System according to claim 1, wherein it also comprises at least one electrode coupled to the measuring device and being positioned outside the linear array for measuring of the surface movements relative to the sensor array.

3. System according to claim 1, wherein the variation in current or voltage is in the range of 10–500 kHz.

4. System according to claim 1, wherein the variation in current or voltage comprises frequency sweeps over a chosen frequency range 10–500 kHz.

5. System according to claim 1, wherein the sensor electrodes are coupled to a measuring instrument for detection of amplitude of the signal and phase differences between the signal from each sensor electrode and the applied varying current or voltage, and from this create a representation of the variation of the impedance along the sensor array.

6. System according to claim 1, wherein each sensor electrode is surrounded by an electrically grounded ring of a conducting material.

7. System according to claim 1, wherein the stimulation electrode is adapted to be electrically coupled to the surface.

8. System according to claim 1, wherein the varying voltage or current is applied to the stimulation electrode in a predetermined time sequence.

9. System according to claim 1, also comprising an activation sensor for activating the system upon the approach of a surface.

10. A system for measuring patterns in a surface, especially in finger surfaces, the system comprising:
a plurality of sensor electrodes arranged in a linear array with an electrically insulating material over which the surface being measured is to be moved;
at least one stimulation electrode positioned separately from the array of sensor electrodes for providing a varying current or voltage between the stimulation electrode and the number of sensors through the surface where said stimulation electrode is coupled to a generator for applying a current or voltage with a varying amplitude or phase to the surface;
a measuring unit coupled to the sensor electrodes for, during the application of the current or voltage, measuring the impedance at the sensor electrodes relative to the stimulation electrode in a time sequence and calculating values of predetermined characteristics of the surface and combining the calculated values for the sensor electrodes over the time sequence for generating a representation of the surface pattern; and
at least one electrode coupled to the measuring device and being positioned outside the linear array for measuring of the surface movements relative to the sensor array.

11. System according to claim 10, wherein the variation in current or voltage is in the range of 10–500 kHz.

12. System according to claim 10, wherein the variation in current or voltage comprises frequency sweeps over a chosen frequency range 10–500 kHz.

13. System according to claim 10, wherein the sensor electrodes are coupled to a measuring instrument for detection of amplitude of the signal and phase differences between the signal from each sensor electrode and the applied varying current or voltage, and from this create a representation of the variation of the impedance along the sensor array.

14. System according to claim 10, wherein each sensor electrode is surrounded by an electrically grounded ring of a conducting material.

15. System according to claim 10, wherein the stimulation electrode is adapted to be electrically coupled to the surface.

16. System according to claim 10, wherein the varying voltage or current is applied to the stimulation electrode in a predetermined time sequence.

17. System according to claim 10, also comprising an activation sensor for activating the system upon the approach of a surface.

18. A system for measuring patterns in a surface, especially in finger surfaces, the system comprising:
a plurality of sensor electrodes arranged in a linear array with an electrically insulating material over which the surface being measured is to be moved;
at least one stimulation electrode positioned separately from the array of sensor electrodes for providing a varying current or voltage between the stimulation electrode and the number of sensors through the surface where said stimulation electrode is coupled to a generator for applying a current or voltage with a varying amplitude or phase to the surface;
an impedance measuring unit coupled to the sensor electrodes for, during the application of the current or voltage, measuring the impedance at the sensor electrodes relative to the stimulation electrode in a time sequence and calculating values of predetermined characteristics of the surface and combining the calculated values for the sensor electrodes; and a signal amplitude and phase difference measuring unit coupled to the sensor electrodes for detection of amplitude of the signal and phase differences between the signal from each sensor electrode and the applied varying current or voltage, and from this create a representation of the variation of the impedance along the sensor array.

* * * * *